Jan. 24, 1967   A. R. COX   3,299,501
METHOD OF MANUFACTURE AND ASSEMBLY OF HOLLOW INFLATABLE
ARTICLES INCLUDING A TWO-PART VALVE THEREIN
Filed April 14, 1964   2 Sheets-Sheet 1

INVENTOR
ALVON R. COX
BY Oldham & Oldham
ATTYS.

Jan. 24, 1967  A. R. COX  3,299,501
METHOD OF MANUFACTURE AND ASSEMBLY OF HOLLOW INFLATABLE
ARTICLES INCLUDING A TWO-PART VALVE THEREIN
Filed April 14, 1964  2 Sheets-Sheet 2

INVENTOR.
ALVON R. COX
BY Oldham & Oldham
ATTYS.

United States Patent Office 3,299,501
Patented Jan. 24, 1967

3,299,501
METHOD OF MANUFACTURE AND ASSEMBLY OF HOLLOW INFLATABLE ARTICLES INCLUDING A TWO-PART VALVE THEREIN
Alvon R. Cox, Ashland, Ohio, assignor to The Faultless Rubber Company, Ashland, Ohio, a corporation of Ohio
Filed Apr. 14, 1964, Ser. No. 359,756
8 Claims. (Cl. 29—451)

The present invention relates to valves for hollow inflatable articles, and especially to novel methods of making and assembling hollow inflatable articles having a two-part valve therein.

Heretofore there have been many different types of valve constructions provided for hollow inflatable articles. These valves normally must be made in large quantities for use in a variety of types of hollow inflatable articles. Particularly in making toys, it is highly desirable that these valves be relatively inexpensive and be sturdy to withstand the rough usage to which the inflatable articles containing the valves are subjected. In many instances, it is also very desirable that the inflatable articles be adapted to to be reinflated should they be deflated at any time during their use.

The general object of the present invention is to provide a new and improved method of producing and assembling a hollow inflatable article having a special two-part valve therein.

Another object of the invention is to provide a two-part valve made from a molded valve retainer that is embedded into the wall of a hollow article as it is produced and which valve is adapted to have a valve body inserted therein after the hollow article has been inflated and expanded and the original shape of the valve retainer has been appreciably altered by tensional forces exerted thereon.

Another object of the invention is to provide a two-part valve wherein a valve retainer is stretched appreciably from its original molded form after which a soft plastic valve body is placed into the valve retainer and further tensions the valve body by association therewith to provide compressive forces on the valve body to produce a reinflatable valve assembly therefrom.

Yet another object of the invention is to provide a valve retainer that has a hardness which is correlated with the amount of expansion of a hollow inflatable article with which the valve retainer is associated whereby the valve retainer will be tensioned or stretched a pre-determined amount to reshape a valve body receiving chamber provided in the valve retainer to a desired size for tensional engagement with a valve body inserted therein after inflation of the article with which the valve retainer is associated.

Other objects of the invention are to provide a novel and improved two-part valve wherein a relatively soft flexible valve body is firmly held in place in a tensioned resilient valve retainer; to stretch a valve retainer in an inflatable article so as to alter the molded shape thereof and adapt it to snugly receive in an air tight manner a soft reinflatable valve therein whereby a reinflatable hollow article can be obtained; to a mold a valve retainer of predetermined hardness and to attach it in the wall of an inflatable article when formed to be stretched in a base portion thereof to substantially twice its initial diameter by inflation of the hollow article; and to adapt a preformed chamber in the valve retainer to receive, snugly, a valve retainer having a base flange appreciably larger than the original molded diameter of the chamber in the valve retainer; and to provide a partially fused molded valve retainer that is attached to or in the wall of an inflatable article and then to complete the fusion of the material forming the valve retainer at the same time that the material forming the inflatable article is fused to final shape and form.

The foregoing and other objects and advantages of the invention will be made more apparent as the specification proceeds.

Attention now is particularly directed to the accompanying drawings wherein the steps of a method forming one embodiment of the principles of the invention are shown, and where:

When referring to corresponding parts shown in the drawings and referred to in the specification, corresponding numerals are used to facilitate comparison therebetween.

Generally speaking, the method of the invention, as one embodiment of the invention, relates to various steps for assembling a two-part valve in an inflatable hollow article and which steps comprise forming a plastic valve retainer having an axially extending bore therein and having a base flange, the bore having an enlarged chamber therein adjacent the base flange, forming a soft plastic valve having a base flange of about twice the diameter of the said chamber, attaching the base flange of the valve retainer to a hollow plastic article with the bore of the valve retainer connecting to the atmosphere and with the valve retainer extending radially inwardly of the hollow article, inflating the hollow article and stretching the base flange and adjacent portions of the valve retainer to increase the diameter of the chamber to almost that of the valve base flange, and forcing the valve into the valve retainer bore to insert the base flange snugly in the chamber and with the top end of the valve usually extending radially inwardly from the valve retainer to provide a reinflatable article by the valve and the valve retainer combination.

Figure 1:
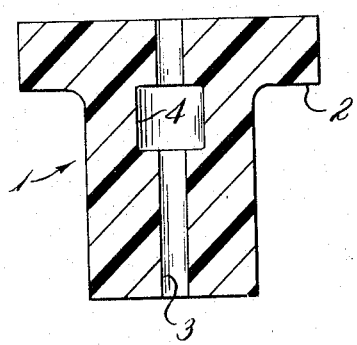
FIG. 1 is a cross section of a molded valve retainer used in the process of the invention.

Attention now is particularly directed to the accompanying drawings wherein the details of the method of the present invention and the novel article produced are illustrated. In FIG. 1 of the drawings, a valve retainer 1 is shown that has an axially extending cylindrical section and a base flange 2 thereon, and with a bore 3 being provided in and extending the length of the valve retainer 1. An enlarged chamber 4 is shown formed in the bore 3 immediately adjacent the base flange 2 but normally positioned to extend radially inwardly from the base flange 2 of this valve retainer, as operatively positioned in the hollow article. The valve retainer 1 is made by any conventional molding process, and it usually is made from a relatively soft plastic material such as a vinyl chloride resin which has been gelled and partially fused by the molding operation, but which normally is not completely fused, cured or set by the initial molding and forming thereof.

Figure 2:
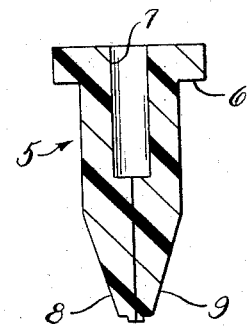
FIG. 2 is a vertical section of a molded valve used in the method and article of the invention.

In FIG. 2, a valve 5 is shown that usually would be made from a plastic material, such as rubber, and is of a relatively soft construction. This valve 5 is shown as having a base flange 6 formed therein and a bore 7 is provided in the valve 5 and extends thereinto from the end thereof having the base flange 6 thereon. The valve 5 also preferably has a pair of sealing lips 8 and 9 formed therein and normally held in their molded shape with flat adjacent surfaces of the sealing lips 8 and 9 being abutted against each other but connecting at their base ends to the bore 7 formed in the valve. Normally these lips 8 and 9 are separated by a diametrically extending cut or slit formed in the valve 5 either during the molding thereof or thereafter, as desired.

Figure 3:
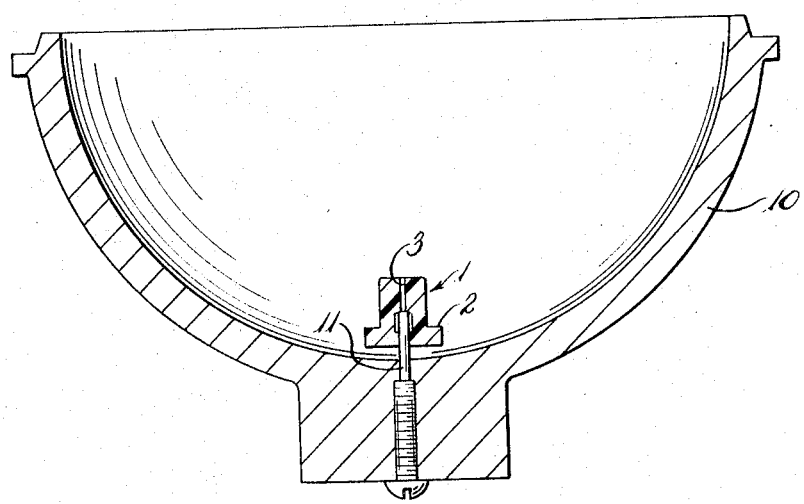
FIG. 3 is a sectional view of apparatus used in one process step of the method of the invention to embed the molded valve retainer in a portion of a molded hollow inflatable article.
Figure 4:
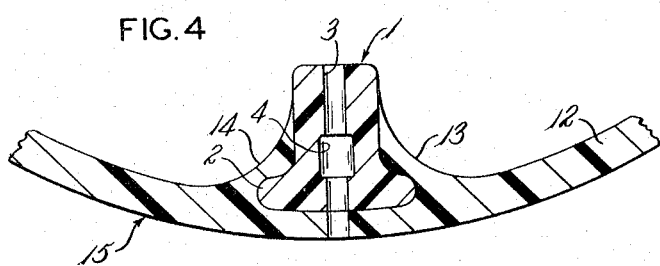
FIG. 4 is a fragmentary vertical section through the hollow article of the invention as produced in the apparatus of FIG. 3.

In the practice of the method of the invention, the valve retainer 1 is positioned in a suitable member, such as a mold section 10, by being engaged with a suitable member such as a stainless steel positioning pin 11 that is carried by the mold section 10 and extends radially inwardly from the cavity defining surface thereof, the pin 11 being adapted to engage the valve retainer 1 so as to space it radially inwardly from this cavity defining surface of the mold section 10. Naturally the mold section 10 can be of any desired contour, and after the valve retainer 1 has been positioned as shown in FIG. 3, then a suitable liquid resin plastisol, such as a polyvinyl chloride resin, in predetermined quantity is placed in the mold section 10 after which a complementary shaped mold section is usually brought into engagement therewith and the mold is suitably processed, rotated, heated and otherwise handled in a conventional manner so as to provide the desired inflatable article from the initially liquid plastisol material. By the rotating and heating actions applied to the molds or mold sections, the liquid material is set, solidified, or gelled to the desired shaped hollow article, or article section, and it forms a wall closely conforming to the cavity defining surfaces of the mold or mold sections. By this action, a wall 12 for the hollow article is produced and such wall 12 has radially inner portions 13 and 14 that flow in over at least the base flange of the valve retainer 1 so as to embed such base flange into the wall of the article and have the valve retainer 1 extending generally radially inwardly of the hollow inflatable article produced. During the formation of this hollow article, including the wall 12, the mold is suitably heated so as to complete the fusion or curing of the material from which the wall 12 and valve retainer 1 is made whereby the hollow article, after cooling to any desired extent, can then be inflated.

It is an important feature of the present invention that a hollow article 15 provided by the invention is to be expanded anywhere from about 150 percent to about 300 percent of its original diameter so that, for example, a ball or other hollow article 15 that is made in a 3 inch diameter mold can be inflated to provide a 7 inch diameter ball, whereas in some instances, a 3 inch ball or other hollow article may be inflated to provide a ball having a diameter of approximately 9 inches.

By the actual tensioning and elongation of the wall 12 in the article 15 by the inflation thereof, naturally the base flange 2 of the valve retainer is appreciably stretched, although not necessarily to the extent of other non-reenforced portions of the wall, and such stretching of the valve retainer 1 normally may provide some slight radial shortening of the valve retainer, but in all events, the bore 3 of the valve retainer has been appreciably enlarged, particularly at its radially outer end, and the chamber 4 of the valve retainer has been likewise appreciably increased in diameter. For example, if the chamber 4 were initially made to a diameter X, then the base flange 6 of the valve for use in this hollow article 15, may have had an initial diameter of approximately 2X. Thus when the ball formed in the mold sections of the invention is inflated to substantially two or three times the molded diameter of the ball, then the initial chamber 4 may have been so distorted as to be of approximately 1¾ X in width, and the chamber usually is radially shortened by such inflation and distortion action.

The valve retainer may have a soft consistency of between about 40 to 50 durometer for maximum stretch thereof and it, for example, would have a harder or tougher consistency such as .60 to .70 durometer.

Figure 5:
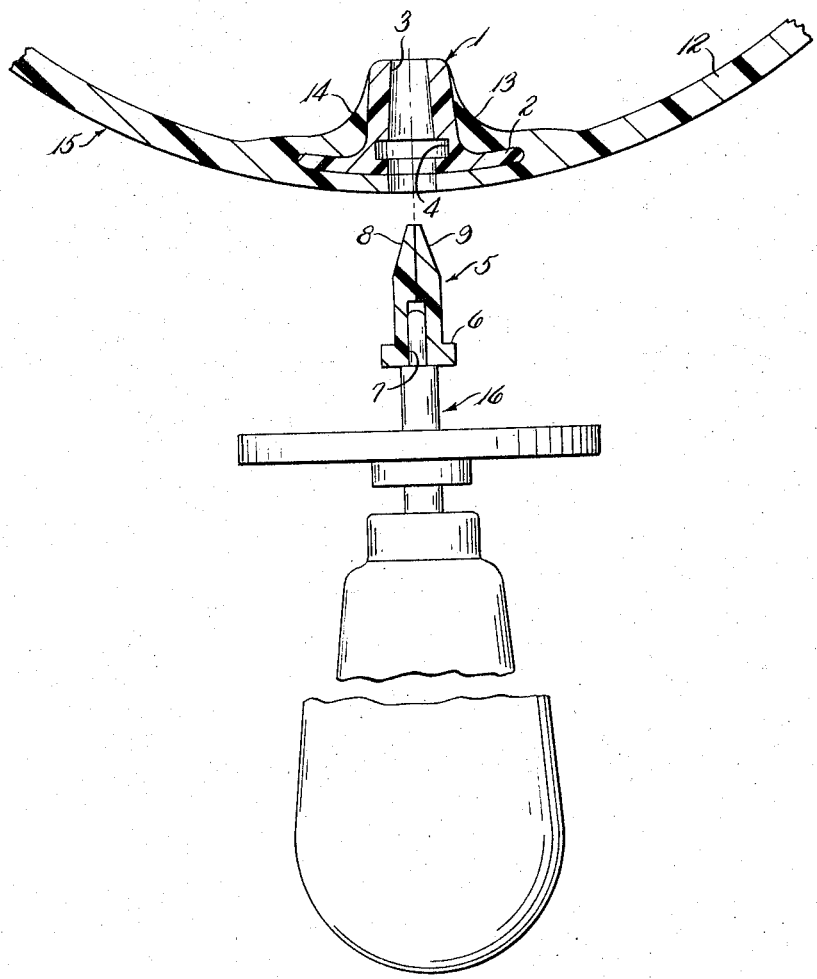
FIG. 5 is a fragmentary vertical section through a hollow inflatable article of the invention in fully inflated form to show the valve retainer shape and to indicate the step of valve insertion.
Figure 6:
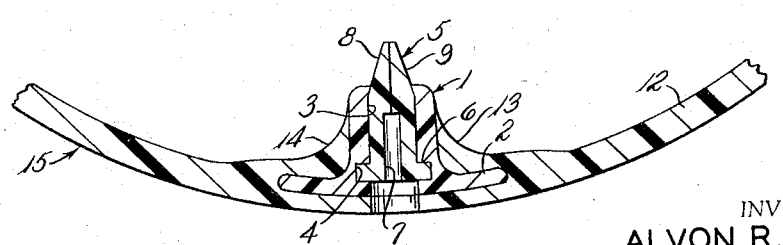
FIG. 6 is a fragmentary vertical section of the valve means of the invention when fully operatively positioned.

FIG. 5 of the drawings shows that the shape of the valve retainer 1 has been appreciably modified, as indicated hereinbefore, by the inflation of the hollow article 15. Such inflation can be accomplished in any desired manner by conventional means. After this desired inflation of the hollow article has been provided, then the valve body 5, usually placed upon a suitable carrier member 16, can be quickly forced into engagement with the bore 3 of the valve retainer from the radially outer end thereof. It will be noted that the bore 3 of the valve retainer at all times connects to or extends to the atmosphere by virtue of use of the pin 11 when molding the wall 12 of the hollow article around the valve retainer.

The valve 5 will in all events be slightly larger in effective diameter than the radially inner end of the bore 3, and the base flange 6 of the valve will be slightly larger than the expanded diameter of the chamber 4, but with the chamber 4 being complementary to the size and shape of the valve base flange 6. Thus, the valve can be forced into or inserted into the bore of the valve retainer to be snugly engaged therewith. This valve 5 then can be opened for inflation or deflation purposes by inserting a standard inflation needle therein so as to separate the sealing lips 8 and 9 and provide any desired hollow article inflation or deflation action.

By the assembly process of the invention, a novel and improved hollow article has been formed, which article can be inflated and reinflated at will by the novel valve means provided by the invention. At the same time, a very inexpensive, but sturdy valve has been provided in this toy or similar article and with the valve components being snugly engaged with each other and providing a long service life. It will be realized that the inflatable article of the invention may comprise a ball, toy, or anything else that is to be inflated and particularly where reinflation or controlled inflation thereof is desired. Thus it is thought that the objects of the invention have been achieved.

While one complete embodiment of the invention has been disclosed herein, it will be appreciated that modification of this particular embodiment of the invention may be resorted to without departing from the scope of the invention as defined in the appended claims.

What is claimed is:

1. A method of assembling a valve in an inflatable hollow article comprising the steps of
   forming a plastic valve retainer having an axially extending bore therein and having a base flange, which bore has an enlarged chamber therein adjacent said base flange,
   forming a soft plastic valve having a base flange larger in diameter than said chamber and having sealing lips at its top end, bonding the base flange of said valve retainer to a hollow plastic article with said bore of said valve retainer connecting to the atmosphere, inflating the hollow article and stretching said base flange of said valve retainer so as to about double the diameter of said chamber, and inserting said valve into said stretched valve retainer bore with said base flange received in said chamber and with the top end of said valve extending radially inwardly from said valve retainer to provide a reinflatable article.

2. A method of assembling a valve in an inflatable hollow article comprising the steps of forming a plastic valve retainer having an axially extending bore therein and having a base flange, which bore has an enlarged chamber therein adjacent said base flange, forming a soft plastic valve having a base flange larger in diameter than said chamber, bonding the base flange of said valve retainer to a hollow plastic article to extend inwardly from the wall thereof and with said bore of said valve retainer connecting to the atmosphere, inflating the hollow article and stretching said base flange of said valve retainer to increase the diameter of said chamber and of said bore, and inserting said valve into said stretched valve retainer bore with said base flange being snugly received in said chamber.

3. A method of assembling a valve in an inflatable hollow article comprising the steps of forming a plastic valve retainer having an axially extending bore therein and having a base flange, which bore has an enlarged chamber therein adjacent said base flange, forming a soft plastic valve having a base flange of about twice the diameter of said chamber, bonding the base flange of said valve retainer to a hollow plastic article with said bore of valve retainer connecting to the atmosphere, inflating the hollow article and stretching said base flange and adjacent portions of said valve retainer to increase the diameter of said chamber to almost that of said valve base flange, and forcing said valve into said stretched valve retainer bore with said base flange being snugly received in said chamber and with the top end of said valve extending radially inward from said valve retainer to provide a reinflatable article.

4. A method of forming and assembling a valve in an expanded hollow plastic article comprising the steps of forming a plastic valve retainer having an axially extended bore therein and having a base flange, which bore has an enlarged chamber therein adjacent said base flange, forming a soft plastic valve having a base flange larger in diameter than said chamber and having sealing lips at its top end, forming an inflatable article from an expansible plastic material that is solidified in situ in engagement with the base flange of said valve retainer to bond and embed said base flange into the wall of said article, the hardness of said valve retainer being correlated with the amount of expansion to be provided in said inflatable article and being harder for less ultimate expansion, inflating the hollow article and thereby stretching said base flange of said valve retainer so as to about double the diameter of said chamber, and inserting said valve into said stretched valve retainer bore with said base flange received in said chamber and with the top end of said valve extending radially inwardly from said valve retainer to provide a reinflatable article.

5. A method of forming and assembling a valve in an expanded hollow plastic article comprising the steps of forming a partially fused plastic valve retainer having an axially extending bore therein and having a base flange, which bore has an enlarged chamber therein adjacent said base flange, forming a soft plastic valve having a base flange larger in diameter than said chamber and having sealing lips at its top end, forming an inflatable article from an expansible plastic material that is solidified in situ in engagement with base flange of said valve retainer to bond and embed said base flange into the wall of said article, heating the inflatable article and valve retainer to fuse the material thereof completely, the hardness of said valve retainer being correlated with the amount of expansion to be provided in said inflatable article, inflating the hollow article and stretching said base flange of said valve retainer so as to about double the diameter of said chamber, and forcing said valve into said stretched valve retainer bore with said base flange received in said chamber and with the top end of said valve extending radially inwardly from said valve retainer to provide an inflatable article.

6. A method of forming and assembling a valve in an expanded hollow plastic article comprising the steps of forming a plastic valve retainer having an axially extending bore therein and having a base flange, which bore has an enlarged chamber therein adjacent said base flange, forming a soft plastic valve having a base flange larger in diameter than said chamber, forming an inflatable article from an expansible plastic material that is solidified in situ in operable engagement with the base flange of said valve retainer to bond and embed said base flange into the wall of said article, inflating the hollow article and stretching said valve retainer to increase the diameter of said chamber and of said bore, and inserting said valve into said stretched valve retainer bore with said base flange received in said chamber and with the top end of said valve extending radially inwardly from said valve retainer.

7. A method of assembling a valve made from a plastic valve retainer having an axially extending bore therein and having a base flange, which bore has an enlarged chamber therein adjacent said base flange and forming a soft plastic valve having a base flange larger in diameter than said chamber and having sealing lips at its top end, bonding the base flange of said valve retainer to a hollow plastic article with said bore of said valve retainer connecting to the atmosphere, inflating the hollow article and stretching said base flange of said valve retainer so as to about double the diameter of said chamber, and inserting said valve into said stretched valve retainer bore with said base flange received in said chamber and with the top end of said valve extending radially inwardly from said valve retainer to provide a reinflatable article.

8. A method of assembling a valve in an inflatable hollow article comprising the steps of forming a plastic valve retainer having an axially extending bore therein and having a base flange, which bore has an enlarged chamber therein at the radially inner edge of said base flange and extending radially inwardly therefrom when considering the valve retainer as positioned in an inflatable article.

forming a soft plastic valve having a base flange larger in diameter than said chamber and having sealing lips at its top end, bonding the base flange of said valve retainer to a hollow plastic article with said bore of said valve retainer connecting to the atmosphere, inflating the hollow article and stretching said base flange of said valve retainer so as to increase the diameter of said chamber, but to have such chamber smaller in diameter than said valve base flange, and inserting said valve into said stretched valve retainer bore with said base flange being snugly received in said chamber.

References Cited by the Examiner

UNITED STATES PATENTS

| | | |
|---|---|---|
| 1,778,399 | 10/1930 | Phelps. |
| 2,346,634 | 4/1944 | Kempthorn _____ 264—94 |
| 2,713,713 | 7/1955 | Tubbs. |
| 2,730,765 | 1/1956 | Crafton et al. _____ 264—310 X |
| 2,856,677 | 10/1958 | Rekettye _____ 29—451 X |
| 3,100,641 | 8/1963 | Nicholls et al. ____ 264—310 X |
| 3,160,691 | 12/1964 | Chupa _____ 264—310 |

CHARLIE T. MOON, *Primary Examiner.*